(12) United States Patent
Miyauchi et al.

(10) Patent No.: US 8,343,883 B2
(45) Date of Patent: Jan. 1, 2013

(54) DIELECTRIC CERAMIC COMPOSITION AND ELECTRONIC COMPONENT USING THE SAME

(75) Inventors: Yasuharu Miyauchi, Tokyo (JP); Tomoko Nakamura, Tokyo (JP); Toshiyuki Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 24 days.

(21) Appl. No.: 12/729,427

(22) Filed: Mar. 23, 2010

(65) Prior Publication Data

US 2010/0243296 A1 Sep. 30, 2010

(30) Foreign Application Priority Data

Mar. 25, 2009 (JP) ................................. 2009-074904

(51) Int. Cl.
*C04B 35/468* (2006.01)
(52) U.S. Cl. ........................................ 501/138; 501/139
(58) Field of Classification Search .................. 501/137, 501/138, 139
See application file for complete search history.

(56) References Cited

U.S. PATENT DOCUMENTS

| | | | |
|---|---|---|---|
| 5,272,122 A | 12/1993 | Mizuno et al. | |
| 6,340,649 B1 * | 1/2002 | Kawata et al. | 501/138 |
| 6,458,734 B1 * | 10/2002 | Sugimoto et al. | 501/139 |
| 6,740,614 B2 | 5/2004 | Kim et al. | |
| 7,687,015 B2 * | 3/2010 | Watanabe et al. | 264/614 |
| 2003/0100429 A1 | 5/2003 | Kim et al. | |
| 2006/0075782 A1 * | 4/2006 | Watanabe et al. | 65/42 |
| 2007/0213202 A1 * | 9/2007 | Arashi et al. | 501/138 |
| 2011/0245066 A1 * | 10/2011 | Nakano et al. | 501/138 |

FOREIGN PATENT DOCUMENTS

| | | |
|---|---|---|
| CN | 1418845 A | 5/2003 |
| EP | 1 860 080 A1 | 11/2007 |
| JP | A-5-70222 | 3/1993 |
| JP | A-5-325641 | 12/1993 |
| JP | 2006273616 | * 10/2006 |
| JP | 2006273617 | * 10/2006 |
| JP | A-2010-228928 | 10/2010 |

OTHER PUBLICATIONS

May 3, 2012 Office Action issued Chinese Patent Application No. 201010141177.5.
Jun. 22, 2012 Extended Search Report issued in European Patent Application No. 10157666.8.
Sep. 19, 2012 Office Action issued in U.S. Appl. No. 13/051,537.
U.S. Appl. No. 13/051,537, filed Mar. 18, 2011.

* cited by examiner

*Primary Examiner* — Karl Group
(74) *Attorney, Agent, or Firm* — Oliff & Berridge, PLC

(57) ABSTRACT

A dielectric porcelain composition contains a major component represented by a composition formula (BaO.xTiO$_2$). The dielectric porcelain composition contains also contains a first minor component represented by a composition formula r$_a$B$_2$O$_3$ and a second minor component represented by a composition formula r$_b$CuO. In the formulae, x is a molar ratio of TiO$_2$ to BaO and is within a range of 4.6 to 8, r$_a$ is a weight ratio of B$_2$O$_3$ with respect to the major component and is within a range of 0.5 to 5% by mass, and r$_b$ is a weight ratio of CuO with respect to the major component and is within a range of 0.1 to 3% by mass.

2 Claims, 1 Drawing Sheet

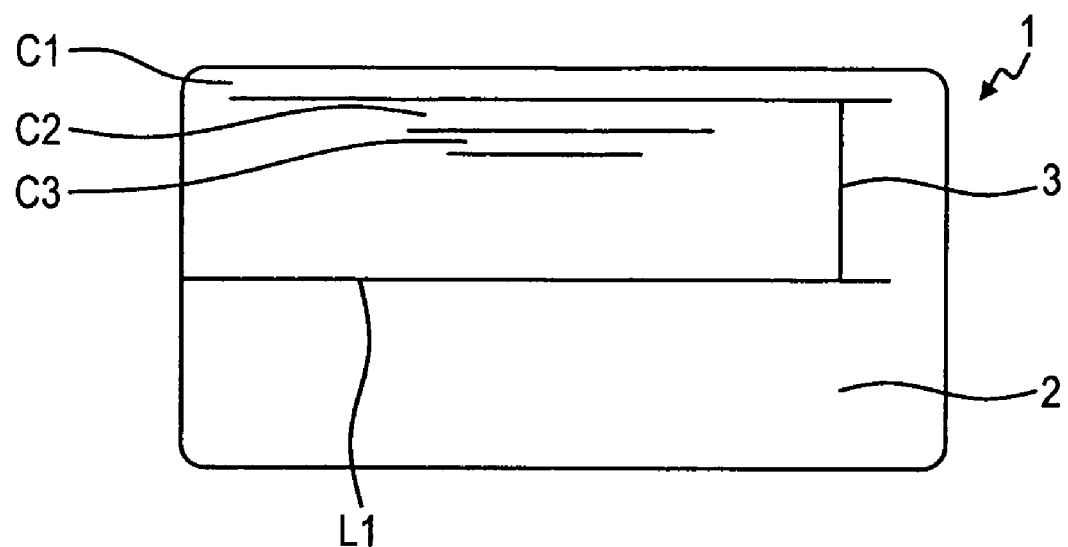

DIELECTRIC CERAMIC COMPOSITION AND ELECTRONIC COMPONENT USING THE SAME

CROSS-REFERENCE TO RELATED APPLICATIONS

This application is based upon and claims the benefit of priority from Japanese Patent Application No. 2009-074904, filed Mar. 25, 2009, the entire contents of which are incorporated herein by reference.

BACKGROUND OF THE INVENTION

1. Field of the Invention

The present invention relates to a dielectric porcelain composition having a low-temperature sintering behavior capable of using a low-melting-point conductive material, such as Ag/Cu, as internal wiring and an electronic component using the dielectric porcelain composition.

2. Description of the Related Art

In mobile communications with cellular phones or the like, a high-frequency band of several hundred MHz to several GHz, which is called a "quasi microwave band", is used. Thus, high-frequency characteristics are emphasized in electronic components, such as resonators, filters, and capacitors, that are used in mobile communication devices.

As for such electronic components, a dielectric porcelain composition having a desired dielectric constant of 30 to 60 at frequencies used and a low dielectric loss may be required depending on their purposes. For the evaluation of a dielectric loss, for example, a quality factor indicated by the factor Qf, which is the product of Q=1/tan δ and a resonance frequency f, is used the lower the dielectric loss, the larger the quality factor Qf. The dielectric loss means a power loss of a high-frequency component, so a dielectric porcelain composition having a large quality factor Qf is required.

As a dielectric material having a dielectric constant of 30 to 60 and a low dielectric loss, many materials composed of BaO—TiO$_2$ ceramics as a major component have been proposed. However, in a case of proposed BaO—TiO$_2$ ceramics, the sintering temperature is as high as over 1000° C., so that even when an internal electrode having a high electrical conductivity, such as Ag/Cu, is formed on a BaO—TiO$_2$ ceramic substrate and laminated with multiple layers, there is a problem of difficulty in co-firing. Thus, to produce a multifunctional substrate using a low-melting-point conductive material, such as Ag/Cu, in an internal electrode thereof by co-firing, it is necessary to reduce the firing temperature to, for example, about 900° C.

Japanese Laid-open Patent Publication No. 05-325641 discloses a technology for achieving low-temperature firing while maintaining high-frequency characteristics by a combination of BaO—TiO$_2$ ceramics as a major component and, as a minor component, at least B$_2$O$_3$ or glass containing B$_2$O$_3$ as one of glass ingredients.

An electronic component, such as a filter, using this kind of dielectric porcelain composition is usually mounted on a resin substrate by soldering. In this case, as the resin substrate, an FR4-grade copper-clad laminate is generally used. In a case of an FR4-grade resin substrate, a linear thermal expansion coefficient of its material is about 13 ppm/° C. However, in conventional technologies as disclosed in Japanese Laid-open Patent Publication No. 05-325641 and the like, a linear expansion coefficient of a dielectric porcelain composition that an electronic component mounted on a resin substrate has is not specifically considered. In the conventional technology disclosed in Japanese Laid-open Patent Publication No. 05-325641, a linear expansion coefficient of a dielectric porcelain composition is, for example, lower than 9 ppm/° C., and differs from a linear thermal expansion coefficient of a resin substrate. As a result, under the condition of high temperature, a difference in expansion between the resin substrate and the dielectric porcelain composition side may occur due to the difference in linear thermal expansion coefficient between the two.

SUMMARY OF THE INVENTION

A dielectric porcelain composition according to an aspect of the present invention contains a major component represented by a composition formula (BaO.xTiO$_2$), where x is a molar ratio of TiO$_2$ to BaO and is within a range of 4.6 to 8; and a first minor component represented by a composition formula $r_a$B$_2$O$_3$, where $r_a$ is a weight ratio of B$_2$O$_3$ with respect to the major component and is within a range of 0.5 to 5% by mass; and a second minor component represented by a composition formula $r_b$CuO, where $r_b$ is a weight ratio of CuO with respect to the major component and is within a range of 0.1 to 3% by mass.

An electronic component according to another aspect of the present invention includes the dielectric porcelain composition according to the present invention; and internal wiring.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The FIGURE is a schematic cross-sectional view illustrating a configuration example of a bandpass filter as an example of an electronic component according to a present embodiment.

DETAILED DESCRIPTION OF THE PREFERRED EMBODIMENTS

Exemplary embodiments according to the present invention will now be described in detail with reference to the accompanying drawings.

A dielectric porcelain composition according to the present embodiment contains a major component represented by a composition formula (BaO.xTiO$_2$). Furthermore, the dielectric porcelain composition according to the present embodiment contains, as a minor component with respect to the major component, a predetermined amount of boron oxide (for example, boron oxide B$_2$O$_3$) and caprate (for example, copper oxide CuO).

First, the reason why BaO—TiO$_2$ ceramics is contained as the major component is that BaO—TiO$_2$ ceramics has a target dielectric constant ∈r of 30 to 60, and also has a high quality factor Qf as it is a low-loss material. In the composition formula (BaO.xTiO$_2$), a molar ratio x of TiO$_2$ to BaO is configured to be within a range of 4.6 to 8 (4.6≦x≦8).

By controlling the range of a value of the molar ratio x, a value of a linear expansion coefficient of the produced dielectric porcelain composition can be changed. If the value of the molar ratio x drops to less than 4.6, i.e., if a ratio of TiO$_2$ content to BaO content is too low, the value of the linear expansion coefficient is much smaller than a target value, and a difference in linear expansion coefficient between the dielectric porcelain composition and a resin substrate as an object increases. On the other hand, if the value of the molar ratio x exceeds 8, i.e., if a ratio of $TiO_2$ content to BaO content is too high, the value of the linear expansion coefficient slightly increases, but a dielectric constant ∈r is larger than the target constant, and a quality factor Qf tends to become smaller, and thus, electrical characteristics are worsened. That's why the molar ratio x of $TiO_2$ to BaO is configured to be within the range of 4.6 to 8 as an appropriate range.

Furthermore, the reason why boron oxide and cuprate are contained as the minor component is that by adding a small amount of boron oxide and cuprate, as sintering aids for forming a liquid phase at the time of firing, in BaO—$TiO_2$ ceramic powder, the major component, low-temperature firing enabling co-firing with a low-melting-point conductive material, such as Ag/Cu, is achieved. Especially, cuprate is contained because of low-temperature sintering and maintenance of a factor Qf with the molar ratio x within the desired range.

One of objects of the present invention is to provide a low-temperature sinterable dielectric porcelain composition used in an electronic component using a low-melting-point conductive material, such as Ag/Cu, as internal wiring, and a decrease characteristics of a quality factor Qf means an increase in loss of the electronic component, so low-temperature sintering is made while maintaining the factor Qf at at least the target value, for example, 10000 GHz or more. From this standpoint, "$r_a$" indicating a weight ratio of boron oxide to the major component is set within a range of 0.5 to 5% by mass ($0.5 \leq r_a \leq 5$) in boron oxide $B_2O_3$ equivalent, and "$r_b$" indicating a weight ratio of cuprate with respect to the major component is set within a range of 0.1 to 3% by mass ($0.1 \leq r_b \leq 3$) in copper oxide CuO equivalent.

A small amount of boron oxide is effective in taking advantage of characteristics of the major component (the factor Qf); however, if a weight ratio of boron oxide is smaller than 0.5% by mass, low-temperature firing at the temperature enabling co-firing with a conductive material, such as Ag/Cu, becomes difficult, and the factor Qf is decreased, which is why the weight ratio of boron oxide is set to be 0.5% by mass or more. Furthermore, the higher the boron oxide content, the easier the low-temperature firing; however, if the weight ratio of boron oxide exceeds 5% by mass, the characteristics of the major component (the factor Qf) is decreased, and low-temperature firing becomes difficult, resulting in a decrease in density after sintering, which is why the weight ratio of boron oxide is set to be 5% by mass or less. Preferably, it is preferred that about 2.5% by mass of boron oxide is contained.

A small amount of cuprate is effective in taking advantage of characteristics of the major component (the factor Qf); however, if a weight ratio of cuprate is smaller than 0.1% by mass, low-temperature firing at the temperature enabling co-firing with a conductive material, such as Ag/Cu, becomes difficult, and the factor Qf is decreased, which is why the weight ratio of cuprate is set to be 0.1% by mass or more. Furthermore, the higher the cuprate content, the easier the low-temperature firing; however, if the weight ratio of cuprate exceeds 3% by mass, the characteristics of the major component (the factor Qf) is decreased, and low-temperature firing becomes difficult, resulting in a decrease in density after sintering, which is why the weight ratio of cuprate is set to be 3% by mass or less. Preferably, it is preferred that about 1% by mass of cuprate is contained.

In the present invention, as the minor component, in addition to boron oxide and cuprate, a slight amount of zinc oxide (for example, zinc oxide ZnO) is added, which further helps the low-temperature firing. "$r_o$" indicating a weight ratio of zinc oxide to the major component is set within a range of 0.1 to 5% by mass ($0.1 \leq r_c \leq 5$) in zinc oxide ZnO.

The dielectric porcelain composition according to the present invention is configured to contain zinc oxide and not to contain any glass ingredient.

Subsequently, a method for producing the dielectric porcelain composition according to the present embodiment and a method for manufacturing an electronic component using the dielectric porcelain composition are explained below.

(1) Preparation of Raw Materials

First, as a major component, a predetermined amount of barium carbonate ($BaCO_3$) powder and titanium oxide $TiO_2$ powder in a desired molar ratio x ($4.6 \leq x \leq 8$) is prepared, and as a minor component to be added, a predetermined amount of boron oxide $B_2O_3$ and copper oxide CuO is prepared. Furthermore, as the minor component, a predetermined amount of zinc oxide ZnO is prepared as needed.

(2) Primary Mixing

The above-mentioned powders are mixed to obtain raw-material mixed powder. The mixing can be made by dry mixing, wet mixing, or the like; for example, the mixing can be made by a mixing method using a solvent, such as pure water or ethanol, with a ball mill. The mixing time is preferably about 4 to 24 hours. After completion of the mixing, it is preferable that the raw-material mixed powder is dried at 100° C. to 200° C., preferably at 120° C. to 140° C., for about 12 to 36 hours.

(3) Primary Firing

The above-mentioned mixed powder is fired at 1100° C. to 1400° C. for about 1 to 10 hours.

(4) Pulverization and Secondary Mixing

After that, the fired mixed powder is pulverized, and mixed with the above-mentioned minor component, and then dried. The pulverization can be made by dry milling, wet milling, or the like; for example, the pulverization can be made by a pulverization method using a solvent, such as pure water or ethanol, with a ball mill. The pulverization time is taken until a desired average particle diameter is obtained. The pulverization/mixing time is preferably 16 to 100 hours. It is preferable that the pulverized powder is dried at the treatment temperature of 100° C. to 200° C., preferably at the treatment temperature of 120° C. to 140° C., for about 12 to 36 hours.

(5) Secondary Firing

Secondary firing is performed to improve the sinterability in firing. The secondary firing is made at the temperature of 600° C. to 800° C. for about 1 to 10 hours.

(6) Secondary Pulverization

After that, the fired raw-material mixed powder is pulverized, and dried. In the pulverization, dry milling, wet milling, or the like can be used. For example, the fired raw-material mixed powder can be pulverized by a pulverization method using a solvent, such as pure water or ethanol, with a ball mill. The pulverization time is preferably about 4 to 24 hours. It is preferable that the pulverized powder is dried at the treatment temperature of 100° C. to 200° C., preferably at the treatment temperature of 120° C. to 140° C., for about 12 to 36 hours.

(7) Forming

Paste is prepared by adding organic vehicle to the obtained powder as needed, and the paste is applied to a base film, such as polyethylene terephthalate. After the application, the organic vehicle is removed by drying, and a green sheet is formed. Incidentally, the organic vehicle is the one obtained by dissolving a binder in an organic solvent. As the solvent, terpineol, butyl carbitol, acetone, toluene, isopropyl alcohol, or the like can be used. As the binder, ethyl cellulose, polyvinyl butyral, or the like can be used. Furthermore, the organic vehicle can contain a plasticizer, such as di-n-butyl phthalate, or the like. Incidentally, the forming is not limited to sheet forming. Alternatively, wet forming, such as printing forming, and dry forming, such as press forming, can be employed; a forming method can be arbitrarily selected according to a desired shape.

(8) Electrode Formation

Conductive paste containing Ag or Cu is applied to the formed green sheet so that an internal electrode having a predetermined shape is formed. In this manner, a plurality of green sheets to which the conductive paste is applied are formed as needed, and stacked in layers to obtain a laminated body. Furthermore, conductive paste is applied to the laminated body so that a terminal having a predetermined shape is formed. After that, organic vehicle is removed from the conductive paste by drying.

(9) Firing

Firing in which the same steps as the firing step and the annealing step in the method for producing the dielectric material described above are performed is preferably made in the oxygen atmosphere, for example, in air, and the firing temperature is required to be below the melting point of a conductor, such as Ag or Ag-based alloy, that is used as an internal electrode, for example, to be 860° C. to 1000° C., preferably 880° C. to 940° C.

(10) Cutting

After cooling, cutting in a unit of an electronic component is made, and an electronic component of which the dielectric porcelain composition and internal wiring are co-fired is completed.

The FIGURE is a schematic cross-sectional diagram illustrating a configuration example of a bandpass filter for high-frequency communications in a cellular phone or the like as an example of an electronic component manufactured in accordance with the manufacturing method. Namely, it is the one obtained in such a manner that a dielectric green sheet formed of the above-mentioned dielectric porcelain composition is produced; a through hole is formed on the green sheet as needed; Ag paste is applied to the green sheet by screen printing; the green sheet is dried; the green sheets are stacked in layers, and processed to be fired, and then cut into individual bodies. In a bandpass filter 1 shown in the FIGURE, 2 denotes a dielectric part formed of the dielectric porcelain composition (laminated ceramics); L1 denotes a coil pattern part formed of an Ag conductor composing an inductor; C1 to C3 denote capacitor pattern parts formed by the Ag conductor; 3 denotes a via hole part connecting between L1 and C1 where the Ag conductor is filled and an LC resonant circuit is formed.

The bandpass filter 1 produced by using a dielectric porcelain composition 2 made up of a major component represented by a composition formula (BaO.xTiO$_2$) with a molar ratio x of TiO$_2$ to BaO within a range of 4.6 to 8 and, as a minor component with respect to the major component, 2.5% by mass of B$_2$O$_3$ and 1% by mass of CuO, was mounted on each of two kinds of resin substrates by soldering. The two kinds of resin substrates are an FR4-grade resin substrate formed of a material having a linear expansion coefficient of 13 ppm/° C. and a resin substrate formed of a material having a linear expansion coefficient of 10 ppm/° C. In each case, since a linear expansion coefficient of the produced bandpass filter 1 is close to 10 ppm/° C., and is not much different from that of the resin substrate, even after a thermal shock test (−55° C. to +125° C., 1000 cycles) was carried out, the dielectric porcelain composition 2 was not cracked, and the soldered part was not come off.

Incidentally, an electronic component using the dielectric porcelain composition can be any of the one composed of only the dielectric porcelain composition and wiring pattern as illustrated in the FIGURE and the one that elements are individually mounted on its exterior.

EXAMPLES

Examples of the dielectric porcelain composition according to the above embodiment of the present invention are explained below. First, in the present example, a value of a linear expansion coefficient α [ppm/° C.] of a dielectric porcelain composition formed when a value of the molar ratio x of TiO$_2$ to BaO in the composition formula of the major component (BaO.xTiO$_2$) was changed was obtained. Table 1 shows a result. Values of the linear expansion coefficient α [ppm/° C.] show numerical values at the temperature of 250° C. when a reference temperature is 50° C.

TABLE 1

|     | 1:4  | 1:4.3 | 1:4.6 | 1:5  | 1:5.5 | 1:6  | 1:7  | 1:8  | FR4 (PCB) |
|-----|------|-------|-------|------|-------|------|------|------|-----------|
| 250 | 7.85 | 8.54  | 9.31  | 9.28 | 9.38  | 9.35 | 9.42 | 9.64 | 13        |

According to the result shown in Table 1, when a linear expansion coefficient 13 [ppm/° C.] of a material of an FR4-grade printed-circuit board (PCB), which is a resin substrate, on which the electronic component containing the dielectric porcelain composition is mounted is set as a target value, if the linear expansion coefficient α is 9 [ppm/° C.] or more, it is not much different from that of the printed-circuit board, and it can be said that it is good. In other words, the result shows that the molar ratio x of TiO$_2$ to BaO just has to be 4.6 or more. The larger the value of the molar ratio x, the larger the value of the linear expansion coefficient α; in addition, it can be seen that the linear expansion coefficient α tends to be saturated toward about 10 [ppm/° C.].

Subsequently, in each of cases of x=5, x=5.5, and x=6 as representative examples of the molar ratio x bringing the linear expansion coefficient α into a desired value, a characteristic value of a dielectric porcelain composition formed when an additive amount (a percentage by mass) of each of boron oxide B$_2$O$_3$, zinc oxide ZnO, and copper oxide CuO, which are composing the minor component, was changed was obtained, and whether it is good or not was determined.

Tables 2 to 4 show results. Incidentally, these results show characteristic values obtained under the conditions that the firing temperature was 933° C. (the preset temperature of a furnace) and the firing time was 2 hours. Determination of whether a quality factor Qf is good or not was made based on whether the quality factor Qf is 10000 GHz or more, i.e., evaluation is "not good" if it is less than 10000 GHz was, and evaluation is "good" if it is 10000 GHz or more. Incidentally, the evaluation of the factor Qf was made based on a measured value at 5 GHz. Furthermore, determination of whether a dielectric constant ∈r is good or not was made based on whether the dielectric constant ∈r is within a range of 30 to 60, and evaluation is "good" if it is within the range of 30 to 60.

TABLE 2

| x = 5 | | | | |
|---|---|---|---|---|
| B$_2$O$_3$(%) | ZnO(%) | CuO(%) | ∈r | Qf(GHz) |
| 1.5 | 2 | 1 | 36.55 | 11756 |
| 2   | 2 | 1 | 37.79 | 12210 |

TABLE 2-continued

| | | x = 5 | | |
|---|---|---|---|---|
| B$_2$O$_3$(%) | ZnO(%) | CuO(%) | ∈r | Qf(GHz) |
| 2.5 | 2 | 1 | 39.87 | 13769 |
| 3 | 2 | 1 | 40.60 | 13688 |
| 3.5 | 2 | 1 | 41.13 | 13500 |
| 2.5 | 1.5 | 1 | 40.46 | 14481 |
| 2.5 | 1 | 1 | 40.50 | 15466 |
| 2.5 | 0.5 | 1 | 41.34 | 16348 |
| 2.5 | 0 | 1 | 41.04 | 18587 |
| 2.5 | 0.5 | 0 | 41.28 | 9101 |
| 2.5 | 0.5 | 0.5 | 39.73 | 14997 |
| 2.5 | 0.5 | 1 | 41.34 | 16348 |
| 2.5 | 0.5 | 1.5 | 41.35 | 14672 |
| 2.5 | 0.5 | 2 | 41.01 | 12789 |

TABLE 3

| | | x = 5.5 | | |
|---|---|---|---|---|
| B$_2$O$_3$(%) | ZnO(%) | CuO(%) | ∈r | Qf(GHz) |
| 1.5 | 2 | 1 | 38.42 | 11345 |
| 2 | 2 | 1 | 39.83 | 12158 |
| 2.5 | 2 | 1 | 41.64 | 13456 |
| 3 | 2 | 1 | 42.58 | 13358 |
| 3.5 | 2 | 1 | 43.09 | 13246 |
| 2.5 | 1.5 | 1 | 42.56 | 13654 |
| 2.5 | 1 | 1 | 42.61 | 14348 |
| 2.5 | 0.5 | 1 | 44.14 | 15147 |
| 2.5 | 0 | 1 | 42.87 | 17629 |
| 2.5 | 0.5 | 0 | 41.09 | 9048 |
| 2.5 | 0.5 | 0.5 | 41.53 | 14250 |
| 2.5 | 0.5 | 1 | 44.14 | 15147 |
| 2.5 | 0.5 | 1.5 | 43.52 | 14352 |
| 2.5 | 0.5 | 2 | 43.52 | 12067 |

TABLE 4

| | | x = 6 | | |
|---|---|---|---|---|
| B$_2$O$_3$(%) | ZnO(%) | CuO(%) | ∈r | Qf(GHz) |
| 1.5 | 2 | 1 | 40.53 | 10527 |
| 2 | 2 | 1 | 41.93 | 11108 |
| 2.5 | 2 | 1 | 43.58 | 12574 |
| 3 | 2 | 1 | 44.38 | 12548 |
| 3.5 | 2 | 1 | 45.10 | 12149 |
| 2.5 | 1.5 | 1 | 44.74 | 12823 |
| 2.5 | 1 | 1 | 44.54 | 13458 |
| 2.5 | 0.5 | 1 | 45.99 | 14578 |
| 2.5 | 0 | 1 | 44.04 | 16825 |
| 2.5 | 0.5 | 0 | 43.00 | 9037 |
| 2.5 | 0.5 | 0.5 | 43.52 | 13476 |
| 2.5 | 0.5 | 1 | 45.99 | 14578 |
| 2.5 | 0.5 | 1.5 | 45.34 | 13495 |
| 2.5 | 0.5 | 2 | 45.23 | 11193 |

According to the above results, in each case, the dielectric constant ∈r was 30 or more, and was within a target range of 30 to 60. Furthermore, in the cases where copper oxide CuO was not contained as the minor component, it can be seen that in each case, appropriate low-temperature firing was difficult, and the sintering behavior was inefficient, resulting in a decrease in density after sintering, and also the factor Qf fell to an extremely low level. Namely, it can be seen that the addition of an appropriate amount of copper oxide CuO as the minor component is essential to ensure the molar ratio x bringing the linear expansion coefficient α into a desired value while maintaining desired electrical characteristics. Meanwhile, in the cases where zinc oxide ZnO was not contained as the minor component, desired electrical characteristics was maintained, and it can be seen that zinc oxide ZnO is not essential in the minor component. However, the addition of zinc oxide ZnO as the minor component is effective in low-temperature firing, and thus it is preferable that an appropriate amount of zinc oxide ZnO is contained.

Subsequently, to make an additive amount (a percentage by mass) of each of boron oxide B$_2$O$_3$, zinc oxide ZnO, and copper oxide CuO, which are composing the minor component, an optimum value and to determine an appropriate range of a value of the molar ratio x of TiO$_2$ to BaO in the composition formula (BaO.xTiO$_2$) of the major component, a characteristic value of a dielectric porcelain composition foamed in each of cases of x=4.6, x=5, x=5.5, x=6, x=7, and x=8 was obtained. Table 5 shows a result.

TABLE 5

| | BaO—xTiO$_2$ | | | | |
|---|---|---|---|---|---|
| x | B$_2$O$_3$(wt %) | CuO(wt %) | ZnO(wt %) | ∈r | Qf(GHz) |
| 4.6 | 2.5 | 1 | 1 | 39.41 | 15832 |
| 5 | 2.5 | 1 | 1 | 40.5 | 15466 |
| 5.5 | 2.5 | 1 | 1 | 42.61 | 14348 |
| 6 | 2.5 | 1 | 1 | 44.54 | 13458 |
| 7 | 2.5 | 1 | 1 | 49.21 | 12543 |
| 8 | 2.5 | 1 | 1 | 58.32 | 11241 |

According to the result shown in Table 5, the larger the value of the molar ratio x, the smaller the factor Qf and the larger the dielectric constant ∈r. When the result shown in Table 5 is checked against the result shown in Table 1, even when the molar ratio x exceeds 8, an increase in linear expansion coefficient α is not really expected, it becomes close to characteristics of titanium oxide TiO$_2$, the factor Qf is decreased, and the dielectric constant ∈r becomes larger beyond the target range, i.e., gets out of the practical range, and thus it can be seen that the molar ratio x is to be 8 or less.

As described above, the present inventors found that a linear expansion coefficient of a dielectric porcelain composition can be close to that of a resin substrate on which an electronic component using the dielectric porcelain composition is mounted by mixing, as a minor component, an appropriate amount of boron oxide and cuprate into BaO—TiO$_2$ ceramics, a major component and appropriately controlling a range of a molar ratio x of TiO$_2$ to BaO in the major component, thereby changing the linear expansion coefficient of the dielectric porcelain composition while maintaining electrical characteristics of the dielectric porcelain composition. Therefore, according to the present invention making ranges of the molar ratio x and weight ratios a and b appropriate as described above, it is possible to provide a dielectric porcelain composition that can be produced by low-temperature firing while maintaining low-loss characteristics of BaO—TiO$_2$ ceramics having a desired dielectric constant of 30 to 60 and is capable of matching linear expansion between a resin substrate and the dielectric porcelain composition to be mounted on the resin substrate, and an electronic component using the dielectric porcelain composition.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A dielectric porcelain composition consisting essentially of:

a major component represented by a composition foiinula (BaO.xTiO$_2$), where x is a molar ratio of TiO$_2$ to BaO and is within a range of 4.6 to 8;

a first minor component represented by a composition formula r$_a$B$_2$O$_3$, where r$_a$ is a weight ratio of B$_2$O$_3$ with respect to the major component and is within a range of 0.5 to 5% by mass; and a second minor component represented by a composition formula r$_b$CuO, where r$_b$ is a weight ratio of CuO with respect to the major component and is within a range of 0.1 to 3% by mass, wherein the dielectric porcelain composition has a linear expansion coefficient equal to or greater than 9.28 ppm/° C. and equal to or less than 9.64 ppm/° C. at a temperature of 250° C. when a reference temperature is 50° C.

2. An electronic component comprising:

the dielectric porcelain composition according to claim 1; and internal wiring.

* * * * *